US008411768B2

(12) United States Patent
Umehara

(10) Patent No.: US 8,411,768 B2
(45) Date of Patent: Apr. 2, 2013

(54) COMMUNICATION SYSTEM, TRANSMISSION APPARATUS, AND RECEIVING APPARATUS

(75) Inventor: Makoto Umehara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 547 days.

(21) Appl. No.: 12/512,625

(22) Filed: Jul. 30, 2009

(65) Prior Publication Data
US 2010/0027699 A1 Feb. 4, 2010

(30) Foreign Application Priority Data

Aug. 1, 2008 (JP) ................................ 2008-200078

(51) Int. Cl.
*H04K 1/10* (2006.01)
(52) U.S. Cl. ......................................................... 375/260
(58) Field of Classification Search .................. 370/203, 370/210, 315, 328; 375/260
See application file for complete search history.

(56) References Cited

U.S. PATENT DOCUMENTS

| 2005/0099936 | A1* | 5/2005 | Fujii et al. .................. 370/203 |
| 2009/0059845 | A1* | 3/2009 | Cooper et al. ............... 370/328 |
| 2009/0262842 | A1* | 10/2009 | Gu et al. .................... 375/260 |
| 2010/0027457 | A1* | 2/2010 | Okuda ....................... 370/315 |

FOREIGN PATENT DOCUMENTS

| JP | 08-088617 A | 4/1996 |
| JP | 2005-304063 A | 10/2005 |

OTHER PUBLICATIONS

Japanese Office Action for Corresponding Patent Application No. JP2008-200078, dated Sep. 24, 2012.

* cited by examiner

Primary Examiner — Leon-Viet Nguyen
(74) Attorney, Agent, or Firm — Carter, DeLuca, Farrell & Schmidt LLP

(57) ABSTRACT

A transmission apparatus for performing an orthogonal frequency division multiplexing (OFDM) transmission generates an OFDM symbol in which a modulation parameter used at a time of transmitting data is arranged in a subcarrier of a direct current component and transmits a transmission frame including the generated OFDM symbol. A receiving apparatus calculates an average value in an effective symbol period within the OFDM symbol included in the transmission frame received, extracts the modulation parameter arranged in the subcarrier of the direct current component based on the calculated average value, and performs OFDM demodulation processing using the extracted modulation parameter.

15 Claims, 8 Drawing Sheets

COMMUNICATION SYSTEM, TRANSMISSION APPARATUS, AND RECEIVING APPARATUS

BACKGROUND OF THE INVENTION

1. Field of the Invention

The present invention relates to a communication system configured to perform an orthogonal frequency division multiplexing (OFDM) transmission.

2. Description of the Related Art

An OFDM transmission system is a system for transmitting an information signal in parallel using a subcarrier orthogonally arranged on a frequency axis. In the OFDM transmission, propagation path conditions, e.g., a ratio of reception signal power to noise power and a ratio of desired signal power to undesired signal power, are generally different for every subcarrier and are also temporarily varied. Therefore, transmission efficiency can be improved by properly selecting a primary modulation system and modulation parameters, e.g., an error correction code and a guard interval (GI) length, according to the propagation path conditions. A transmission mode can be flexibly changed by selecting the modulation parameters according to a request of transmission data. For example, data can be reproduced with high accuracy by changing a symbol length according to an output cycle of video data or sound data and handling symbol timing as reproduction timing in a receiving apparatus.

When a transmission apparatus transmits a modulation parameter that changes the modulation parameter in such a way, the transmission apparatus needs to notify the modulation parameter at a time of changing to a receiving apparatus so that the receiving apparatus can correctly perform demodulation processing. Particularly, when a parameter relating to an operation of fast Fourier transform (FFT), e.g., changing of a symbol length, is changed, the receiving apparatus needs to extract a modulation parameter before receiving an effective symbol of a next symbol.

Japanese Patent Application Laid-Open No. 08-088617 discusses a technology which multiplexes a modulation parameter with a control symbol provided at a predetermined position in a transmission frame and transmits it. In this technology, a transmission apparatus transmits the modulation parameter by changing an envelope of the control symbol. A receiving apparatus extracts the modulation parameter from the control symbol and then performs a demodulation processing corresponding to the parameter. In this case, since the modulation parameter is extracted by low processing delay without performing a frequency analysis by FFT, it is possible to change an operation relating to FFT of the next symbol.

However, since the method discussed in Japanese Patent Application Laid-Open No. 08-088617 needs to provide a control symbol for transmitting a modulation parameter in a transmission frame, there is a problem that the method significantly squeezes a transmission band when a frequency of change of the modulation parameter is high.

SUMMARY OF THE INVENTION

The present invention is directed to a system suppressing a decrease of a transmission band and capable of communicating a modulation parameter even when the modulation parameter is changed at a high frequency.

According to an aspect of the present invention, a communication system includes a transmission apparatus and a receiving apparatus for performing an orthogonal frequency division multiplexing (OFDM) transmission. The transmission apparatus includes a generation unit configured to generate an OFDM symbol in which a modulation parameter used at a time of transmitting data is arranged in a subcarrier of a direct current component, and
a transmission unit configured to transmit a transmission frame including the OFDM symbol generated by the generation unit. The receiving apparatus includes
a calculation unit configured to calculate an average value in an effective symbol period within the OFDM symbol included in the received transmission frame,
an extraction unit configured to extract the modulation parameter arranged in the subcarrier of the direct current component based on the calculated average value, and a demodulation unit configured to perform OFDM demodulation processing using the modulation parameter extracted by the extraction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

In the exemplary embodiments of the present invention, a transmission apparatus generates a transmission signal in which symbol-timing is changed for every effective symbol by using an adjustment symbol described below. Therefore, the transmission apparatus needs to notify timing for every effective symbol to a receiving apparatus. When such communication is executed in a communication system discussed in Japanese Patent Application Laid-Open No. 08-088617, the transmission apparatus needs to insert a control symbol for notifying the timing for every effective symbol, and thus a transmission band is significantly squeezed. To solve this problem, the transmission apparatus of the present exemplary embodiments arranges the timing information in a direct current carrier, i.e., a subcarrier having a frequency of 0, as a modulation parameter, performs OFDM modulation on the information, and transmits it to the receiving apparatus. The receiving apparatus extracts the modulation parameter arranged in the direct current carrier by performing code determination on a movement average value of a reception signal and carries out a demodulation processing based on a result of the extraction.

A principle of a modulation parameter transmission method of the present exemplary embodiment will be described below.

Figure 2:
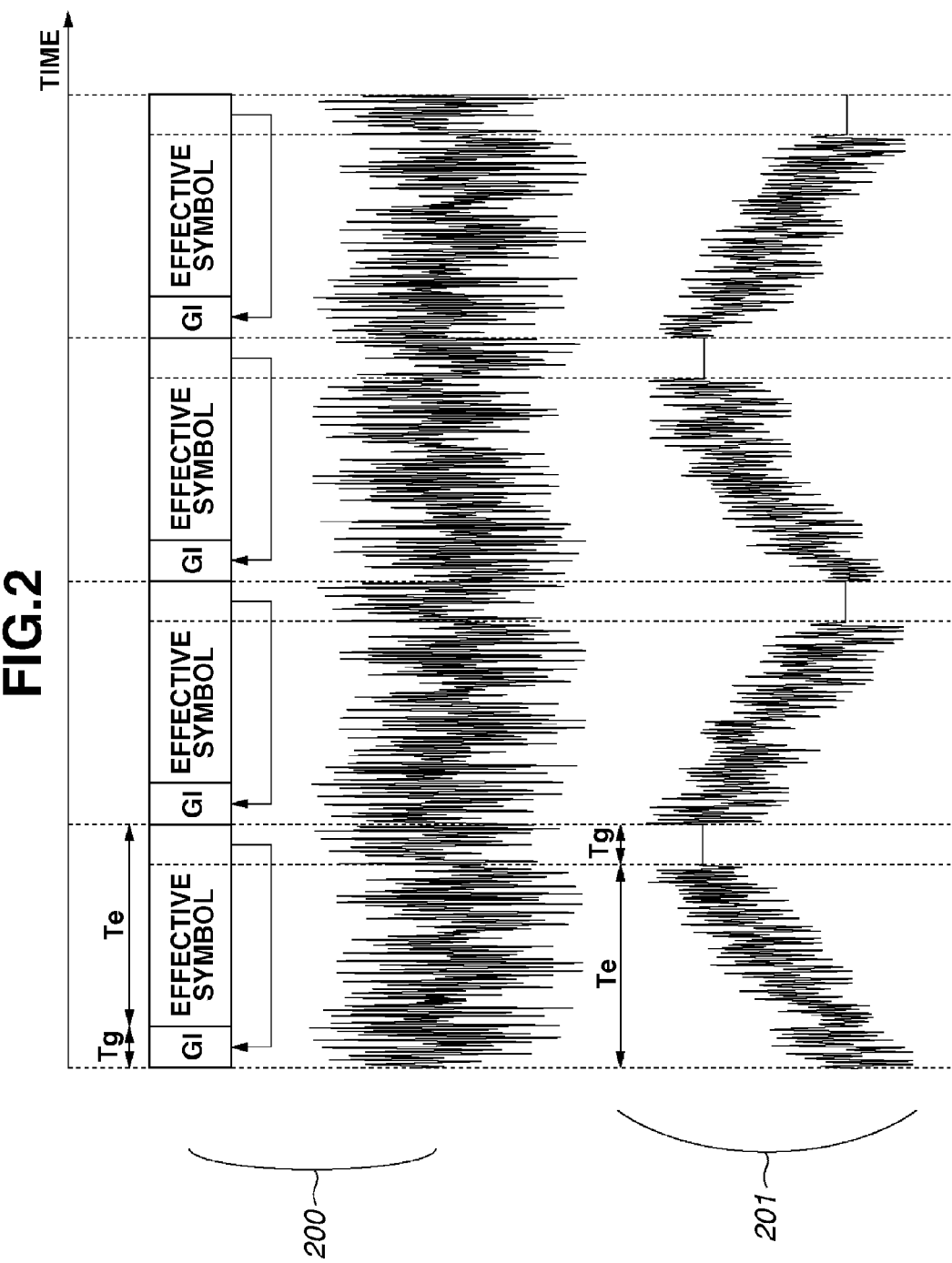
FIG. 2 illustrates a view describing a baseband OFDM signal and a movement average value.

FIG. 2 illustrates examples of a time axis waveform of an OFDM baseband signal in which a modulation parameter is arranged in a direct current carrier and a movement average value in an effective symbol period of the OFDM baseband signal. The OFDM baseband signal is a complex signal, but FIG. 2 illustrates only real number parts. An OFDM symbol of an OFDM baseband signal 200 includes an effective symbol having a time length of Te[sec] and a guard interval (GI) having a time length of Tg[sec] which is a copy of the rear part of the effective symbol. More specifically, in the OFDM symbol including the effective symbol and the GI, a copy of a part corresponding to the length of the GI of the rear end part of the effective symbol is used as data of a period of the GI. The time axis waveform of the effective symbol is a group of subcarriers having a basic frequency of 1/Te[Hz] as illustrated in the formula (1). Therefore, when an average value of the effective symbol is calculated, a value of n=0, i.e., a value reflecting a phase and an amplitude value of only a direct current carrier is calculated as illustrated in the formula (2).

$$S_{Pe}(t) = \sum_{n=-N}^{N} d(n) \cdot e^{j \cdot 2\pi n \cdot f_0 \cdot t} \quad (1)$$

Total carrier number: 2N+1
d(n): A phase and an amplitude value of the n-th subcarrier $$f_0 = \frac{1}{Te} \quad (2)$$
$$0 \le t < Te$$
$$\int_0^{Te} d(n) \cdot e^{j \cdot 2\pi n \cdot f_0 \cdot t} dt \quad n \ne 0$$
$$\int_0^{Te} d(n) \cdot e^{j \cdot 2\pi n \cdot f_0 \cdot t} dt = d(0) * Te \quad n = 0$$

Further, since the GI is a copy of the effective symbol, when an average value of Te[sec] is calculated in the OFDM symbol, a similar value is calculated. On the other hand, when an average value of Te[sec] including an OFDM symbol boundary is calculated, an average value of the subcarrier of n≠0 is not 0, but the average value is a value reflecting a phase and an amplitude value of every subcarriers. More specifically, the movement average value in the effective symbol period of the OFDM baseband signal is a value reflecting a phase and an amplitude value of a direct current carrier of a symbol during Tg[sec] after the elapse of Te[sec] from beginning of the symbol, as illustrated in 201 in FIG. 2. Therefore, when the movement average value during this period is subjected to code determination, information arranged in the direct current carrier can be extracted. For example, when an amplitude value of the direct current carrier is subjected to the code determination, a value of a predetermined modulation parameter can be acquired.

Figure 3:
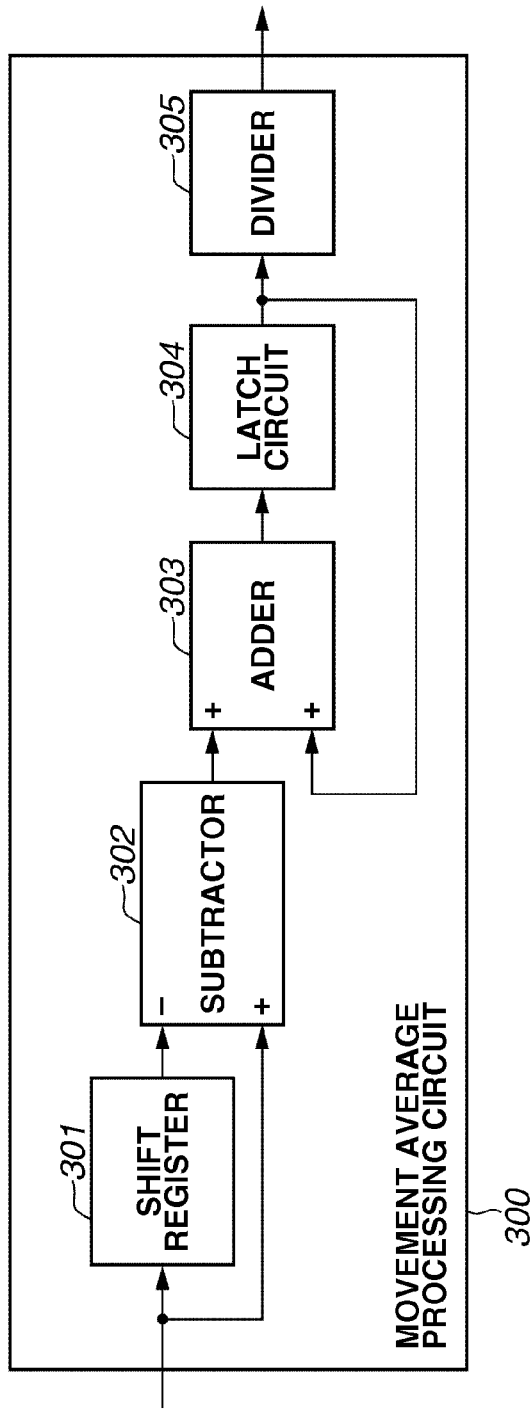
FIG. 3 is a block diagram illustrating a configuration example of a movement average processing circuit according to the present exemplary embodiment.

FIG. 3 is a block diagram illustrating an internal configuration example of a movement average processing circuit for extracting information arranged in the direct current carrier. A movement average processing circuit 300 includes a shift resister 301, a subtractor 302, an adder 303, a latch circuit 304, and a divider 305. A baseband OFDM signal is input to the shift resister 301 and the subtractor 302, and a data delayed by a number of samples of the effective symbol is subtracted from the input data in the shift resister 301. Output data from the subtractor 302 is added to an output of the latch circuit 304, and then divided by the number of samples of the effective symbol in the divider 305 so as to output a movement average value. The latch circuit 304 latches a result of the addition made by the adder 303. In the above movement average processing, the movement average value in which a length of the effective symbol is treated as a unit is calculated. After the processing by the number of samples of the effective symbol ends, a value calculated by the following formula is acquired.

[An Addition value by the number of samples of an effective symbol]−[the oldest sample value]+[a new sample value]
Therefore, by copying data during the last Tg period of the effective symbol to the GI in the OFDM symbol, an average value of the effective symbol is kept during the GI period after calculating the samples of the effective symbol from the beginning of the OFDM symbol. The reason for this is that "the value of the oldest sample" is equal to "the value of a new sample" during the GI period.

When such movement average processing circuit 300 is used, the movement average value is calculated by two times of addition/subtraction and one time of division, so that the modulation parameter arranged in the direct current carrier can be extracted with low processing delay and a simple configuration. More specifically, since the modulation parameter can be extracted before the effective symbol of a next symbol is received, the communication system of the present exemplary embodiment can change the modulation parameter including a parameter relating to FFT. In an example illustrated in FIG. 8, a modulation parameter indicating a gap length between the OFDM symbols is extracted from the effective symbol. In this case, since an exclusive symbol for transmitting the modulation parameter is not used, the data transmission band can be kept constant regardless of the frequency of change of the modulation parameter.

Based on the aforementioned principle, the communication system of the present exemplary embodiment can perform the OFDM transmission by selecting a modulation parameter for every transmission frame including one or more symbols. A 5.1 channel sound system will be described as one example of the communication system to which the present invention is applied.

Figure 4:
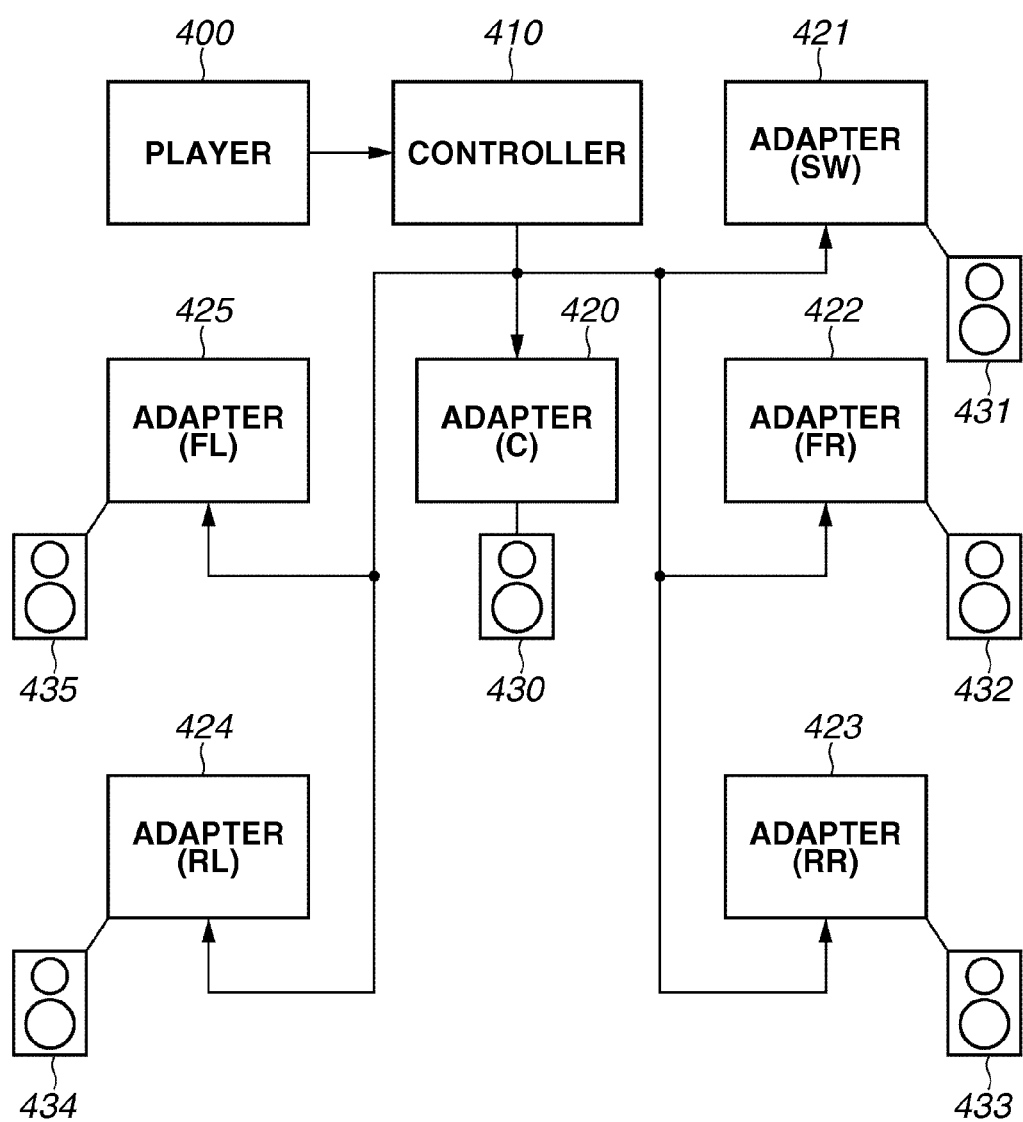
FIG. 4 is a block diagram illustrating a configuration example of a 5.1 channel sound system according to the present exemplary embodiment.

FIG. 4 is a block diagram of a 5.1 channel sound system as a communication system according to the present exemplary embodiment. A player 400 reads multi-channel sound data from a medium recording sound data such as an optical disk and outputs sound data of a pulse code modulation (PCM)-type sound data for every channel and a signal for reproducing/synchronizing to an external. A controller 410 subjects the sound data input from the player 400 to the OFDM modulation and transmits the data to the adapters 420 to 425.

The adapters 420 to 425 receive the sound data transmitted from the controller 410 and output the data to speakers 430 to 435 connected with each adapter. The speakers 430 to 435 output sound signals output from the adapters 420 to 425 connected with each speaker as a sound. Sound channels corresponding to installation locations of the speakers 430 to 435 are assigned to the adapters 420 to 425. In FIG. 4, the adapters 420 and 421 are respectively assigned to a center (c) channel and a subwoofer (SW) channel. The adapters 422, 423, 424, and 425 are respectively assigned to a front right (FR) channel, a rear right (RR) channel, a rear left (RL) channel, and a front left (RL) channel.

Figure 5:
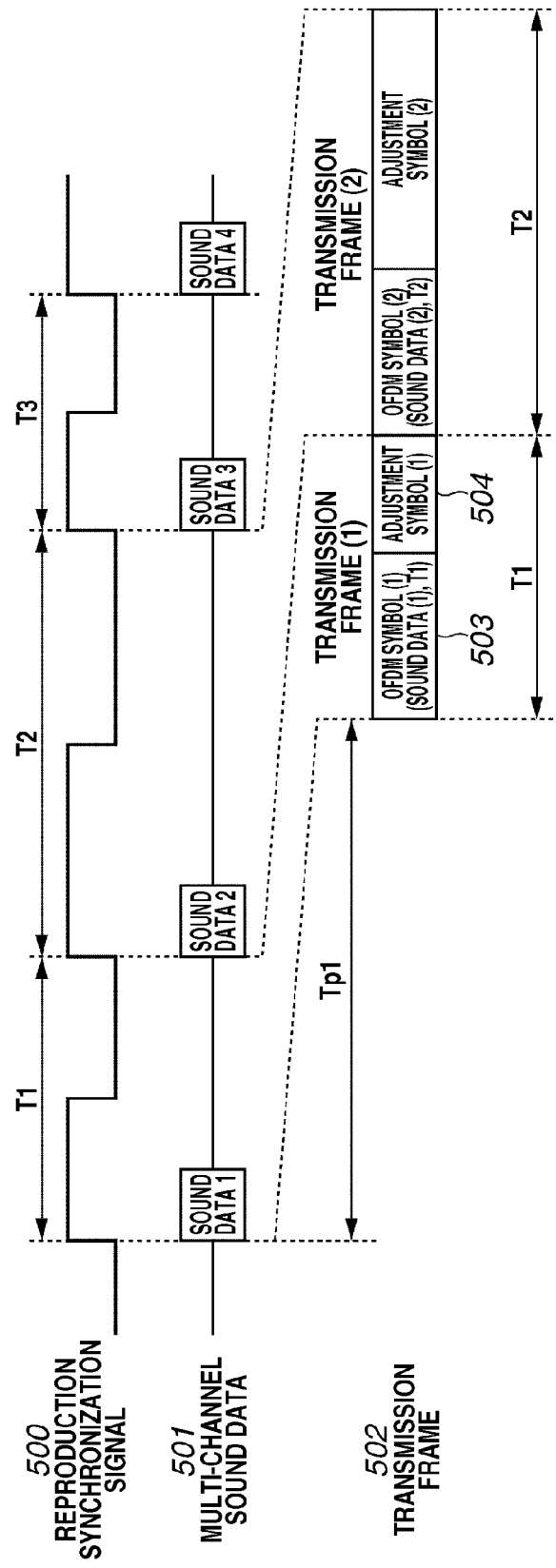
FIG. 5 illustrates a view describing transmission of a transmission frame according to a transmission apparatus of the present exemplary embodiment.

FIG. 5 is a view describing a transmission frame which the controller 410 transmits to the adapters 420 to 425.

The player 400 outputs a signal 500 for reproducing/synchronizing to the controller 410. Cycle times (T1, T2, and T3) of the signal 500 for reproducing/synchronizing have fluctuations in time depending on a jitter component of a clock frequency in the player 400. The player 400 outputs a sound data 501 to the controller 410. The player 400 outputs a multi-channel sound data of one sample point for every standup of the signal 500 for reproducing/synchronizing. The controller 410 generates a transmission frame 502 based on the signal 500 for reproducing/synchronizing and the sound data 501 and transmits the frame to the adapters 420 to 425. The transmission frame 502 includes an OFDM symbol 503 having a fixed length and an adjustment symbol 504 having a variable length and the controller 410 transmits the transmission frame 502 continuously in time.

The OFDM symbol 503 is a symbol that performs the OFDM modulation on sound data for one sample point and time length information in the transmission frame 502. For example, the OFDM symbol (1) of the transmission frame (1) is a symbol that performs the OFDM modulation on the sound data (1) and time length information indicating a time length T1 of the transmission frame (1). Similarly, the OFDM symbol (2) of the transmission frame (2) is a symbol that performs the OFDM modulation on the sound data (2) and time length information indicating a time length T2 of the transmission frame (2). The adjustment symbol 504 is a symbol provided so as to correspond the time length of the transmission frame 502 with the cycle time of the signal 501 for reproducing/synchronizing. A null symbol is used as the adjustment symbol 504.

After processing delay time Tp1 [sec] relating to the frame generation elapses from the standup of the signal 500 for reproducing/synchronizing, the controller 410 transmits the transmission frame 502 to the adapters 420 to 425.

When there is a difference between the data transmission speeds of the player 400 and the controller 410, if the player 400 continuously inputs data to the controller 410 for a long time, a loss of data may occur. The reason for this is that an overflow or an underflow of the transmission data occurs in the controller 410. However, in the present exemplary embodiment, since the transmission frame has the aforementioned configuration, the data transmission speeds of the player 400 and the controller 410 are the same including the fluctuation component of the player 400. Thus, the transmission apparatus of the present exemplary embodiments can transmit data having high quality without generating the loss of data.

One example of operations of the controller 410 and the adapters 420 to 425 will be described below. In this example, a sampling frequency of sound data output from the player 400 is 48 kHz and an internal operation clock of the controller 410 and the adapters 420 to 425 is 90 MHz. However, the present invention is not limited to this example.

Figure 1:
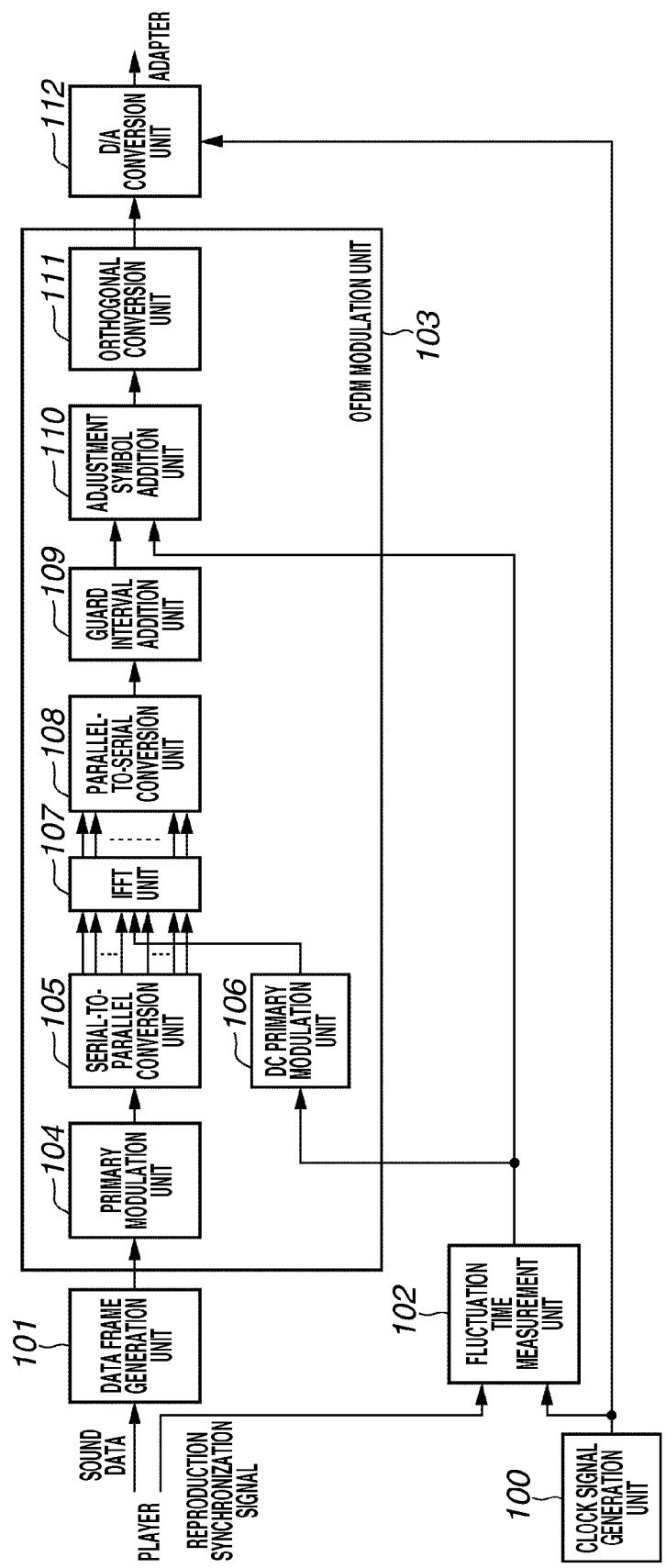
FIG. 1 is a block diagram illustrating a configuration example of a controller as a transmission apparatus for transmitting data according to the present exemplary embodiment.

FIG. 1 is a block diagram illustrating an internal configuration example of the controller 410 as a transmission apparatus. In FIG. 1, a clock signal generation unit 100 generates a clock signal of 90 MHz and outputs the signal to each unit in the controller 410.

Figure 6:
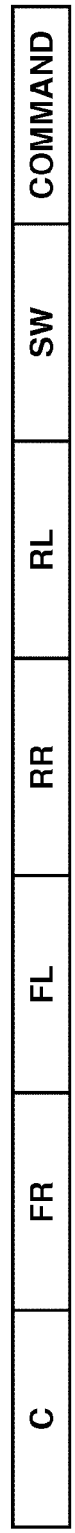
FIG. 6 illustrates a configuration of a data frame used in the present exemplary embodiment.

A data frame generation unit 101 generates a data frame having a configuration illustrated in FIG. 6 from multi-channel sound data input from the player 400 and outputs the data frame to the OFDM modulation unit 103. In FIG. 6, areas indicated by C, FR, FL, RR, RL, and SW are data areas of a C channel, a FR channel, a FL channel, a RR channel, a RL channel, and a SW channel. Further, in the areas indicated as command, commands corresponding to the adapters 420 to 425 are placed.

A fluctuation time measurement unit 102 counts a cycle time of the signal for reproducing/synchronizing input from the player 400 with the clock signal of 90 MHz input from the clock signal generation unit 100, for every one cycle. When the signal for reproducing/synchronizing does not have a fluctuation in time, the cycle time of the signal for reproducing/synchronizing is $1/48$ kHz and its counted number is 1875 by the 90 MHz clock. The fluctuation time measurement unit 102 starts counting for every standup of the signal for reproducing/synchronizing and outputs a difference between the counted number for every one cycle of the signal for reproducing/synchronizing and the counted number, 1875, to the OFDM modulation unit 103 as a fluctuation time information of the signal for reproducing/synchronizing.

An OFDM modulation unit 103 includes a primary modulation unit 104, a serial-to-parallel conversion unit 105, a direct current (DC) primary modulation unit 106, an inverse fast Fourier transform (IFFT) unit 107, a parallel-to-serial conversion unit 108, a GI addition unit 109, an adjustment symbol addition unit 110, and an orthogonal modulation unit 111. The primary modulation unit 104 subjects the data frame input from the data frame generation unit 101 to digital modulation, e.g., quadrature phase shift keying (QPSK), and the serial-to-parallel conversion unit 105 converts the data frame to parallel data. The primary modulation unit 104 outputs the parallel data to the IFFT unit 107. Further, the DC primary modulation unit 106 subjects the fluctuation time information input from the fluctuation time measurement unit 102b to digital modulation, e.g., 16 quadrature amplitude modulation (16 QAM) and outputs the modulated information to the IFFT unit 107. More specifically, the DC primary modulation unit 106 determines a modulation parameter based on the fluctuation time information, subjects the parameter to the digital modulation, e.g., the 16 QAM, and outputs the modulated parameter. The output data from the DC primary modulation unit 106 is input to the IFFT unit 107 to be arranged in a direct current carrier.

The IFFT unit 107 subjects the data input from the serial-to-parallel conversion unit 105 and the DC primary modulation unit 106 to a inverse fast Fourier transform (IFFT) processing, and generates an effective symbol. The parallel-to-serial conversion unit 108 coverts the effective symbol output from the IFFT unit 107 to serial data and outputs the symbol to the GI addition unit 109. The GI addition unit 109 adds the GI to a front end of the effective symbol to generate a baseband OFDM symbol and outputs the baseband OFDM symbol to the adjustment symbol addition unit 110. The GI is a copy from data of the predetermined sample numbers of the rear end of the effective symbol output from the parallel-to-serial conversion unit 108. The adjustment symbol addition unit 110 adds an adjustment symbol having a time length based on the fluctuation time information input from the fluctuation time measurement unit 102 to a rear end of the baseband OFDM symbol to generate a baseband transmission frame and outputs the frame to the orthogonal modulation unit 111.

The orthogonal modulation unit 111 orthogonally modulates the baseband transmission frame to generate a transmission frame, which is converted to a frequency of a transmission band and outputs the generated transmission frame to a digital-to-analog (D/A) conversion unit 112. The D/A conversion unit 112 subjects the transmission frame to D/A conversion based on the 90 MHz clock input from the clock signal generation unit 100 and transmits the converted frame to the adapters 420 to 425.

By operations of each unit, the controller 410 generates a transmission frame 502 illustrated in FIG. 5 and transmits the transmission frame 502 to the adapters 420 to 425. Further, when the OFDM symbol in the transmission frame 502 is converted to the frequency of the baseband, the fluctuation time information of the transmission frame 502 is arranged in a direct current component of the OFDM symbol.

Configurations and operations of the adapters 420 to 425 as receiving apparatuses will be described below with reference to FIGS. 7 and 8. By an initial operation using a preamble symbol, it is assumed that clocks in the adapters 420 to 425 and controller 410 and communication starting time are synchronized. The adapters 420 to 425 extract the fluctuation time information from the transmission frame received from the controller 410 and perform demodulation processing based on the fluctuation time information.

Figure 7:
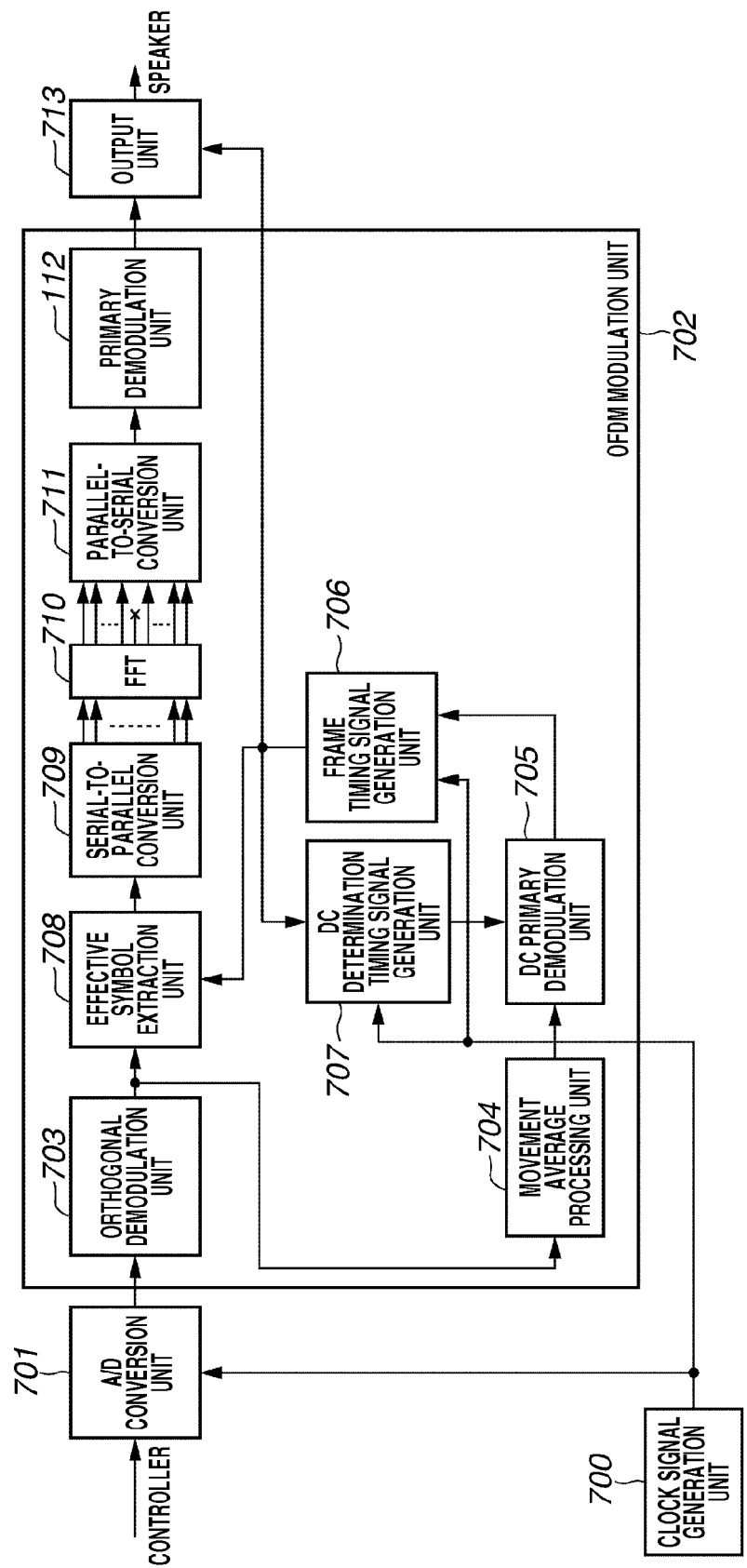
FIG. 7 is a block diagram illustrating a configuration example of an adapter used as a receiving apparatus receiving data according to the present exemplary embodiment.
Figure 8:
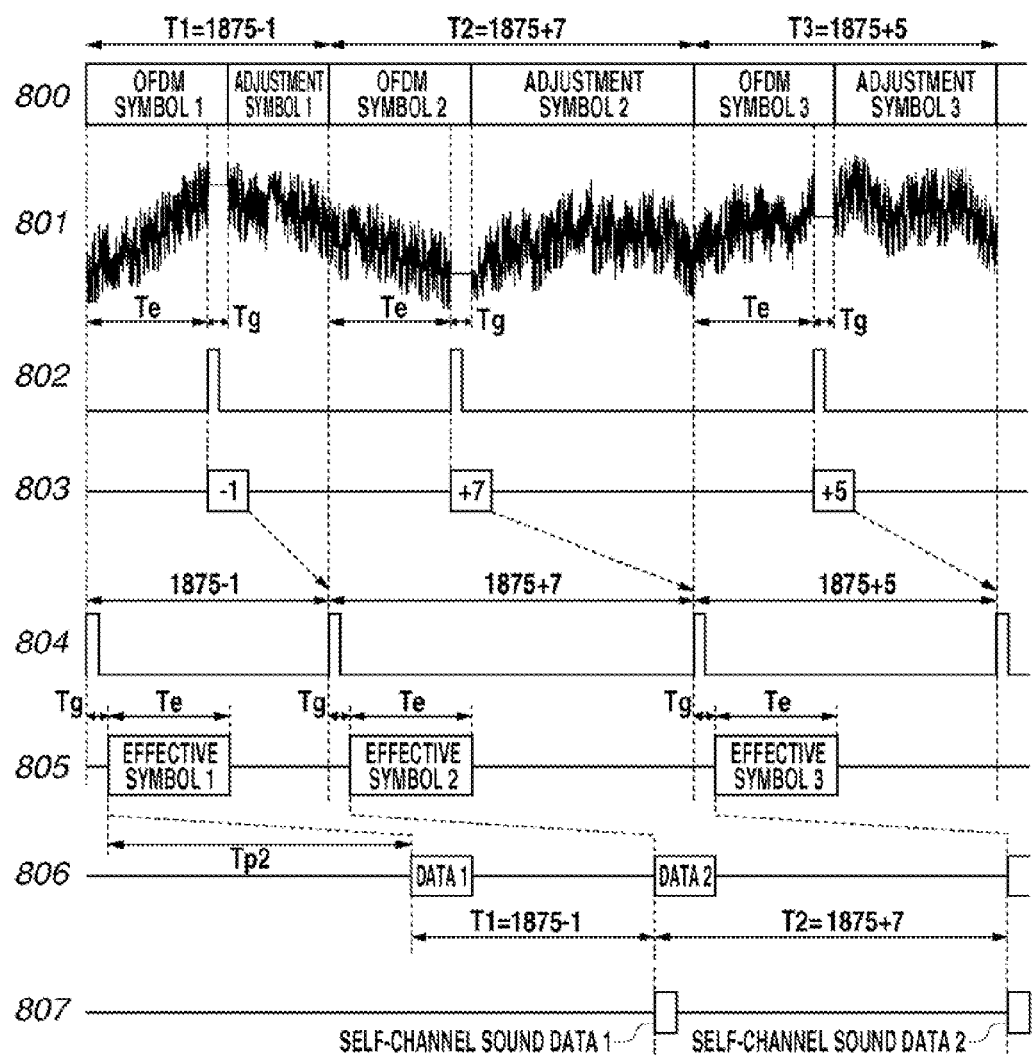
FIG. 8 illustrates a timing of an input/output signal at an adaptor.

FIG. 7 is a block diagram illustrating an internal configuration of the adapters 420 to 425. FIG. 8 is a timing view of an internal signal in the adapters 420 to 425.

A clock signal generation unit 700 generates a 90 MHz clock synchronizing with the clock signal of the controller 410 and outputs the 90 MHz clock to each unit in the adapters 420 to 425.

An analog-to-digital (A/D) conversion unit 701 subjects the transmission frame received from the controller 410 to A/D conversion based on the 90 MHz clock input from the clock signal generation unit 700 and outputs the converted frame to an OFDM demodulation unit 702.

The OFDM demodulation unit 702 includes an orthogonal demodulation unit 703, a movement average processing unit 704, a DC primary demodulation unit 705, a frame timing signal generation unit 706, and a DC determination timing signal generation unit 707. Further, the OFDM demodulation unit 702 includes an effective symbol extraction unit 708, a serial-to-parallel conversion unit 709, a FFT unit 710, a parallel-to-serial conversion unit 711, and a primary demodulation unit 712.

The orthogonal demodulation unit 703 orthogonally demodulates the transmission frame input from the A/D conversion unit 701, obtains a baseband transmission frame 800 (FIG. 8) that is converted to the frequency of a baseband, and outputs the converted frame to the movement average processing unit 704 and the effective symbol extraction unit 708.

The movement average processing unit 704 includes the aforementioned movement average processing circuit 300 illustrated in FIG. 3. The movement average processing unit 704 calculates a movement average value 801 (FIG. 8) of the sample numbers of the effective symbol (Se[sample]=Te [sec]×90[MHz]) and outputs the calculated value to the DC primary demodulation unit 705. The movement average value 801 reflects the phase and the amplitude of the direct current carrier in Tg[sec] after Te[sec] elapses from the beginning of the frame.

The DC primary demodulation unit 705 subjects the movement average value 801 to a code determination based on a determination timing signal 802 (FIG. 8) output from the DC determination timing signal generation unit 707 so as to extract time length information 803 (FIG. 8), and outputs the extracted information to the frame timing signal generation unit 706.

The frame timing signal generation unit 706 operates based on the 90 MHz clock input from the lock signal generation unit 700 and the time length information 803. The frame timing signal generation unit 706 generates a pulse signal (a frame timing signal 804 illustrated in FIG. 8), which stands up after counting 1875 plus time length information from the last time standup. The frame timing signal 804 is a signal indicating a starting position (a starting time) of the baseband transmission frame 800.

The DC determination timing signal generation unit 707 generates a determination timing signal 802, which indicates code determination timing to the DC primary demodulation unit 705. The DC determination timing signal generation unit 707 operates based on the 90 MHz clock input from the clock signal generation unit 700 and generates a pulse signal making a frame timing signal 804 to delay by Te[sec]. The code determination timing may only be equal to or less than Tg [sec] after Te [sec] elapses from the beginning of the frame and suppresses a noise component. The DC primary demodulation unit 705 may also be configured to perform the code determination after the movement average value 801 is subjected to an addition average processing within this period. More specifically, the DC primary demodulation unit 705 may subject the value acquired by an addition average of the movement average values to the code determination in a period corresponding to the GI period after the effective symbol period elapses from the beginning of the OFDM symbol. The DC primary demodulation unit 705 acquires a modulation parameter by subjecting the movement average value to the code determination in a period beginning after the effective symbol period elapses from the start point of the OFDM symbol, up to the end of the OFDM symbol (i.e., during a period from Te to Te+Tg).

The effective symbol extraction unit 708 extracts only an effective symbol 805 from the baseband transmission frame 800 and outputs the extracted symbol to the serial-to-parallel conversion unit 709. The effective symbol is the Te[sec] period after Tg[sec] elapses from the beginning of the frame, and the effective symbol extraction unit 708 outputs only the effective symbol to the serial-to-parallel conversion unit 709 based on the frame timing signal 804.

The serial-to-parallel conversion unit 709 coverts the effective symbol 805 to parallel data, and the FFT unit 710 subjects the parallel data to FFT processing. Then, the FFT unit 710 outputs the processed data except the direct current component to the parallel-to-serial conversion unit 711. The parallel-to-serial conversion unit 711 converts the data to serial data after the FFT processing. The primary demodulation unit 712 subjects the serial data to QPSK demodulation and outputs the demodulated data to an output unit 713 as a data frame 806. Accordingly, the OFDM demodulation unit 702 performs the OFDM demodulation processing. The OFDM demodulation unit 702 outputs the data frame 806 to the output unit 713 after processing time Tp2 [sec] elapses after the effective symbol 805 is input in the serial-to-parallel conversion unit 709.

The output unit 713 extracts only sound data of a self-channel from the data frame input from the OFDM demodulation unit 702 and outputs the sound data to speakers (431 to 435) connected therewith. At this time, the output unit 713 outputs the self-channel sound data to the speakers 431 to 435 synchronizing with an input timing of a data frame to be input next time, as illustrated in the self-channel sound data 807 in FIG. 8. By the operations of each unit, the adapters 420 to 425 output the data to the speakers 430 to 435 in the cycle corresponding with the transmission frame transmitted from the controller 410. More specifically, since the data transmission speeds of the controller 410 and the adapters 420 to 435 are the same, the speakers can output sound without interruption.

In the present exemplary embodiment, as an example, time length information of a transmission frame is transmitted as a modulation parameter. However, the present invention can be widely applied to various kinds of parameter transmissions relating to modulation systems, e.g., a primary modulation system, an error correction code, and a FFT point number. In the present exemplary embodiment, an average value of an effective symbol is calculated with a movement average. However, the present invention is not limited to the illustrated method as long as it can acquire an average value of an effective symbol.

In the present exemplary embodiment, transmission of sound data is described as an example. However, the present invention is not limited to the example. The present invention can be widely applied to transmission of streaming data that requires punctuality, e.g., video data.

According to the present exemplary embodiment, even when a modulation parameter is changed at a high frequency, the modulation parameter relating to a primary modulation system, an error correction code, and FFT can be changed without decreasing a transmission band. As a result, a transmission system and a transmission apparatus that selects an adequate modulation parameter can be realized according to a propagation path state or transmission data.

In the present invention, it is also possible to attain a part or the whole of the functions described in the exemplary embodiment by executing a program of software using computers.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-200078 filed Aug. 1, 2008, which is hereby incorporated by reference herein in its entirety.

What is claimed is:

1. A communication system comprising:
  a transmission apparatus comprising:
    a generation unit configured to generate an orthogonal frequency division multiplexing (OFDM) symbol in which a modulation parameter at a time of data transmission is arranged in a subcarrier of a direct current component;
    an adjustment symbol addition unit configured to add an adjustment symbol having a time length based on fluctuations in a clock signal to a rear end of the OFDM symbol; and
    a transmission unit configured to transmit a transmission frame including the OFDM symbol and the adjustment symbol; and
  a receiving apparatus comprising:
    a calculation unit configured to calculate an average value within an effective symbol period in the OFDM symbol included in the transmission frame received by the receiving apparatus;
    an extraction unit configured to extract the modulation parameter arranged in the subcarrier of the direct current component based on the calculated average value; and
    a demodulation unit configured to perform OFDM demodulation processing using the modulation parameter extracted by the extraction unit,
  wherein the OFDM symbol includes an effective symbol and a guard interval, and the modulation parameter includes timing information for the effective symbol.

2. The communication system according to claim 1, wherein the generation unit copies a portion of a rear end of the effective symbol corresponding to a length of the guard interval to the guard interval.

3. The communication system according to claim 1, wherein the extraction unit further comprises:
  a movement average processing unit configured to calculate a movement average value treating a length of the effective symbol as a unit; and
  a code determination unit configured to subject the movement average value to code determination in a period beginning after an effective symbol period elapses from a start time of the OFDM symbol up to an end time of the OFDM symbol, and to acquire the modulation parameter.

4. The communication system according to claim 3, wherein the code determination unit is configured to subject an addition average of the movement average values to code determination in a period corresponding to a period of the guard interval after an effective symbol period elapses from a start time of the OFDM symbol.

5. A transmission apparatus for performing orthogonal frequency division multiplexing (OFDM) transmission, the transmission apparatus comprising:
  a generation unit configured to generate an OFDM symbol arranging a modulation parameter used at a time of data transmission in a subcarrier of a direct current component;
  an adjustment symbol addition unit configured to add an adjustment symbol having a time length based on fluctuations in a clock signal to a rear end of the OFDM symbol; and
  a transmission unit configured to transmit a transmission frame including the OFDM symbol and the adjustment symbol,
  wherein the OFDM symbol includes an effective symbol and a guard interval, and the modulation parameter includes timing information for the effective symbol.

6. A receiving apparatus for performing orthogonal frequency division multiplexing (OFDM) reception, the receiving apparatus comprising:
  a receiving unit configured to receive a transmission frame including an OFDM symbol arranging time information related to a data transmission frame in a subcarrier of a direct current component and an adjustment symbol having a time length based on fluctuations in a clock signal added to a rear end of the OFDM symbol;
  a discriminating unit configured to discriminate an average value in an effective symbol period within the OFDM symbol included in the received transmission frame;
  a determining unit configured to determine the time information related to the data transmission frame based on the discriminated average value; and
  a demodulation unit configured to perform OFDM demodulation processing using the time information determined by the determining unit.

7. A control method for performing orthogonal frequency division multiplexing (OFDM) communication, the control method comprising:
generating an OFDM symbol in which a modulation parameter at a time of data transmission is arranged in a subcarrier of a direct current component;
adding an adjustment symbol having a time length based on fluctuations in a clock signal to a rear end of the OFDM symbol;
transmitting a transmission frame including the OFDM symbol and the adjustment symbol;
receiving the transmission frame;
calculating an average value in an effective symbol period within the OFDM symbol included in the received transmission frame;
extracting the modulation parameter arranged in the subcarrier of the direct current component based on the calculated average value; and
performing OFDM demodulation processing using the extracted modulation parameter,
wherein the OFDM symbol includes an effective symbol and a guard interval, and the modulation parameter includes timing information for the effective symbol.

8. A control method of a transmission apparatus for performing orthogonal frequency division multiplexing (OFDM) transmission, the control method comprising:
generating an OFDM symbol in which a modulation parameter used at a time of transmitting data is arranged in a subcarrier of a direct current component;
adding an adjustment symbol having a time length based on fluctuations in a clock signal to a rear end of the OFDM symbol; and
transmitting a transmission frame including the generated OFDM symbol and the adjustment symbol,
wherein the OFDM symbol includes an effective symbol and a guard interval, and the modulation parameter includes timing information for the effective symbol.

9. A control method of a receiving apparatus for performing orthogonal frequency division multiplexing (OFDM) reception, the control method comprising:
receiving a transmission frame including an OFDM symbol arranging time information related to a data transmission frame in a subcarrier of a direct current component and an adjustment symbol having a time length based on fluctuations in a clock signal added to a rear end of the OFDM symbol;
discriminating an average value in an effective symbol period within the OFDM symbol included in the received transmission frame;
determining the time information related to the data transmission frame based on the discriminated average value; and
performing OFDM demodulation processing using the time information.

10. The transmission apparatus according to claim 5, wherein the generation unit copies a portion of a rear end of the effective symbol corresponding to a length of the guard interval to the guard interval.

11. The transmission apparatus according to claim 5, further comprising a measurement unit configured to measure fluctuations of a cycle time of signal input from an external apparatus,
wherein the adjustment symbol addition unit adds the adjustment symbol having the time length based on fluctuations measured by the measurement unit.

12. The transmission apparatus according to claim 5, further comprising a modulation unit configured to modulate a transmission frame including the OFDM symbol and the adjustment symbol,
wherein the transmission unit transmits the transmission frame modulated by the modulation unit.

13. The receiving apparatus according to claim 6, wherein the determining unit further comprises:
a movement average processing unit configured to calculate a movement average value treating a length of the effective symbol as a unit; and
a code determination unit configured to perform code determination of the movement average value in a period beginning after an effective symbol period elapses from a start time of the OFDM symbol up to an end time of the OFDM symbol, and to acquire the time information.

14. The receiving apparatus according to claim 13, wherein the code determination unit is configured to perform the code determination of an addition average of the movement average values in a period corresponding to a period of a guard interval after an effective symbol period elapses from a start time of the OFDM symbol.

15. The receiving apparatus according to claim 13, further comprising:
an output unit configured to output data demodulated by the demodulation unit based on the time length of the adjustment symbol.

* * * * *